United States Patent
Dana et al.

[11] Patent Number: 5,908,689
[45] Date of Patent: Jun. 1, 1999

[54] GLASS FIBER STRAND MATS, THERMOSETTING COMPOSITES REINFORCED WITH THE SAME AND METHODS FOR MAKING THE SAME

[75] Inventors: David E. Dana; Edward A. Martine, both of Pittsburgh; Steven J. Morris, Sarver; Thomas P. Unites, Pittsburgh, all of Pa.

[73] Assignee: PPG Industries, Inc., Pittsburgh, Pa.

[21] Appl. No.: 08/787,735

[22] Filed: Jan. 24, 1997

[51] Int. Cl.$^6$ ..................................................... B32B 7/02
[52] U.S. Cl. .......................... 428/219; 442/331; 442/388; 442/391; 442/402; 28/107; 427/389.7; 427/389.9; 264/258
[58] Field of Search ..................................... 442/331, 388, 442/391, 402, FOR 100, FOR 160, FOR 161; 428/219; 28/107; 427/389.7, 389.9; 264/258

[56] References Cited

U.S. PATENT DOCUMENTS

| | | | |
|---|---|---|---|
| 2,528,091 | 10/1950 | Slayter | 442/391 |
| 3,614,936 | 10/1971 | Phillipps | 112/420 |
| 3,713,962 | 1/1973 | Ackley | 161/154 |
| 3,883,333 | 5/1975 | Ackley | 65/2 |
| 3,889,035 | 6/1975 | Jakes | 428/227 |
| 4,277,531 | 7/1981 | Picone | 428/228 |
| 4,278,720 | 7/1981 | Shannon | 428/109 |
| 4,335,176 | 6/1982 | Baumann | 428/228 |
| 4,404,717 | 9/1983 | Neubauer et al. | 28/107 |
| 4,532,169 | 7/1985 | Carley | 428/109 |
| 4,615,717 | 10/1986 | Neubauer et al. | 65/4.4 |
| 4,692,375 | 9/1987 | Neubauer et al. | 428/299 |
| 4,752,513 | 6/1988 | Rau et al. | 428/91 |
| 4,927,869 | 5/1990 | Dana et al. | 523/502 |
| 4,955,999 | 9/1990 | Schaefer et al. | 65/4.4 |
| 5,129,131 | 7/1992 | Kimura et al. | 28/107 |
| 5,441,590 | 8/1995 | Ihm et al. | 156/148 |
| 5,580,646 | 12/1996 | Jansz et al. | 428/228 |

FOREIGN PATENT DOCUMENTS

| | | |
|---|---|---|
| 0 646 454 | 4/1995 | European Pat. Off. . |
| 2 057 783 | 12/1969 | Germany . |
| 1 571 503 | 10/1977 | Germany . |
| 51-149974 | 12/1976 | Japan . |
| 55-133952 | 10/1980 | Japan . |
| 62-013906 | 3/1987 | Japan . |
| 6-248550 | 9/1994 | Japan . |
| 95 075 846 | 8/1995 | Japan . |
| 0 220 513 | 5/1987 | WIPO . |
| WO 95/09133 | 4/1995 | WIPO . |

OTHER PUBLICATIONS

K. Loewenstein, The Manufacturing Technology of Glass Fibres, (3d Ed. 1993) at pp. 22–27, 30–44, 47–60, 115–151, 165–173, 219–222, 237–291, 315.

Encyclopedia of Polymer Science & Technology, vol. 6, (1967), pp. 505–712.

"High Performance Needle Punching Machines", May 12, 1993, a Product Bulletin of Textilmaschinenfabrik, Dr. Ernst Fehrer AG.

*Primary Examiner*—Christopher Raimund
*Attorney, Agent, or Firm*—Ann Marie Cannoni

[57] ABSTRACT

The present invention provides a mat adapted to reinforce a thermosetting matrix material to form a composite, composites formed therefrom, and methods related thereto. The mat includes a primary, supporting layer having a plurality of randomly oriented essentially continuous glass fiber strands. The primary layer has about 1 to about 10 weight percent of the mat on a total solids basis. The mat also includes a secondary layer positioned upon and supported by a surface of the primary layer, the secondary layer including a plurality of glass fiber strands. The mean average length of the glass fiber strands of the secondary layer ranges from about 20 to about 125 millimeters. The strands of the primary layer are entangled with the strands of the secondary layer by needling the primary layer and the secondary layer together.

17 Claims, 5 Drawing Sheets

GLASS FIBER STRAND MATS, THERMOSETTING COMPOSITES REINFORCED WITH THE SAME AND METHODS FOR MAKING THE SAME

FIELD OF THE INVENTION

This invention relates generally to glass fiber strand mats, thermosetting composites reinforced with the same and methods for making the same. More particularly, this invention relates to needled mats having a primary layer of continuous glass fiber strands and a secondary layer of chopped glass fiber strands, thermosetting composites reinforced with the same and methods for making the same.

BACKGROUND OF THE INVENTION

Continuous glass fiber strands, chopped strands, roving, cloth or mat can be used to reinforce thermosetting and/or thermoplastic matrix materials. Reinforced composites can be formed by pultrusion, filament winding, compression or injection molding and open lay-up molding such materials. These composites can be used in such applications as automobile components, boat hulls and fishing rods.

For reinforcing a resin matrix material, U.S. Pat. No. 3,713,962 discloses needled fibrous mats of unstranded glass filaments (column 2, lines 25–32) as a surfacing mat and a reinforcing mat of continuous glass fiber strands (column 4, lines 24–28) impregnated with a resin matrix material.

U.S. Pat. No. 5,580,646 discloses, at column 5, lines 10–21, a thermoplastic composite comprising at least two glass mats which comprise glass fiber strands selected from the group consisting of continuous glass fiber strands and chopped glass fiber strands and mixtures thereof wherein each glass mat is asymmetrically needled and wherein thermoplastic resin is placed between the glass mats.

In a conventional sheet molding compounding ("SMC") process, wound packages of roving are supplied to the process from a creel and chopped to provide reinforcement mat prior to being impregnated with a thermosetting matrix resin. There is a long-felt need in the industry to reduce or eliminate equipment, labor cost and physical space requirements associated with locating a roving supply system at the molding facility and provide a glass fiber product which has good uniformity and handling characteristics and which provides a composite having good physical and aesthetic properties.

SUMMARY OF THE INVENTION

One aspect of the present invention is a mat adapted to reinforce a thermosetting matrix material, the mat comprising: (a) a primary, supporting layer comprising a plurality of randomly oriented essentially continuous glass fiber strands, the primary layer comprising about 1 to about 20 weight percent of the mat on a total solids basis; and (b) a secondary layer positioned upon and supported by a surface of the primary layer, the secondary layer comprising a plurality of glass fiber strands, the mean average length of the glass fiber strands of the secondary layer ranging from about 20 to about 125 millimeters, wherein the strands of the primary layer are entangled with the strands of the secondary layer by needling the primary layer and the secondary layer together.

Another aspect of the present invention is a mat adapted to reinforce a thermosetting matrix material, the mat comprising: (a) a primary, supporting layer comprising a plurality of randomly oriented essentially continuous polymeric fibers, the primary layer comprising about 1 to about 20 weight percent of the mat on a total solids basis; and (b) a secondary layer positioned upon and supported by a surface of the primary layer, the secondary layer comprising a plurality of glass fiber strands, the mean average length of the glass fiber strands of the secondary layer ranging from about 20 to about 125 millimeters, wherein the strands of the primary layer are entangled with the strands of the secondary layer by needling the primary layer and the secondary layer together.

Another aspect of the present invention is a reinforced polymeric composite comprising: (a) a thermosetting matrix material; and (b) a reinforcing mat comprising: (1) a primary, support layer comprising a plurality of randomly oriented essentially continuous glass fiber strands, the primary layer comprising about 1 to about 20 weight percent of the mat on a total solids basis; and (2) a secondary layer comprising a plurality of glass fiber strands, the mean average length of the glass fiber strands ranging from about 25 to about 125 millimeters, a first side of the secondary layer being adjacent to the second side of the primary layer, wherein the strands of the primary layer are entangled with the strands of the secondary layer by needling.

Another aspect of the present invention is a method for making a mat adapted to reinforce a thermosetting matrix material, the method comprising the steps of: (a) dispersing a plurality of essentially continuous glass fiber strands to form a primary, support layer, such that the glass fiber strands of the primary layer are randomly oriented; and (b) dispersing a plurality of chopped glass fiber strands upon a surface of the primary layer, the mean average length of the chopped glass fiber strands ranging from about 25 to about 125 millimeters; and (c) entangling the essentially continuous glass fiber strands of the primary layer with the chopped glass fiber strands of the secondary layer by needling the layers together.

Another aspect of the present invention is a method for reinforcing a thermosetting matrix material to form a reinforced composite, the method comprising the steps of: (a) dispersing a plurality of essentially continuous glass fiber strands to form a primary, support layer, such that the glass fiber strands of the primary layer are randomly oriented; and (b) dispersing a plurality of chopped glass fiber strands upon a surface of the primary layer, the mean average length of the chopped glass fiber strands ranging from about 25 to about 125 millimeters; (c) entangling the essentially continuous glass fiber strands of the primary layer with the chopped glass fiber strands of the secondary layer by needling the layers together to form a mat; (d) coating and impregnating at least a portion of the mat with a thermosetting matrix material; and (e) at least partially curing the thermosetting matrix material to form a reinforced composite.

BRIEF DESCRIPTION OF THE DRAWINGS

The foregoing summary, as well as the following detailed description of the preferred embodiments, will be better understood when read in conjunction with the appended drawing. In the drawings:

FIG. 2a is an enlarged view of a portion of FIG. 2;

DETAILED DESCRIPTION OF THE PREFERRED EMBODIMENTS

The mats of the present invention ameliorate the need for expensive equipment and labor associated with locating a mat formation operation at the molding facility by providing a mat which substantially retains its structural integrity during transportation to the molding facility and subsequent handling during the molding process.

Figure 1:
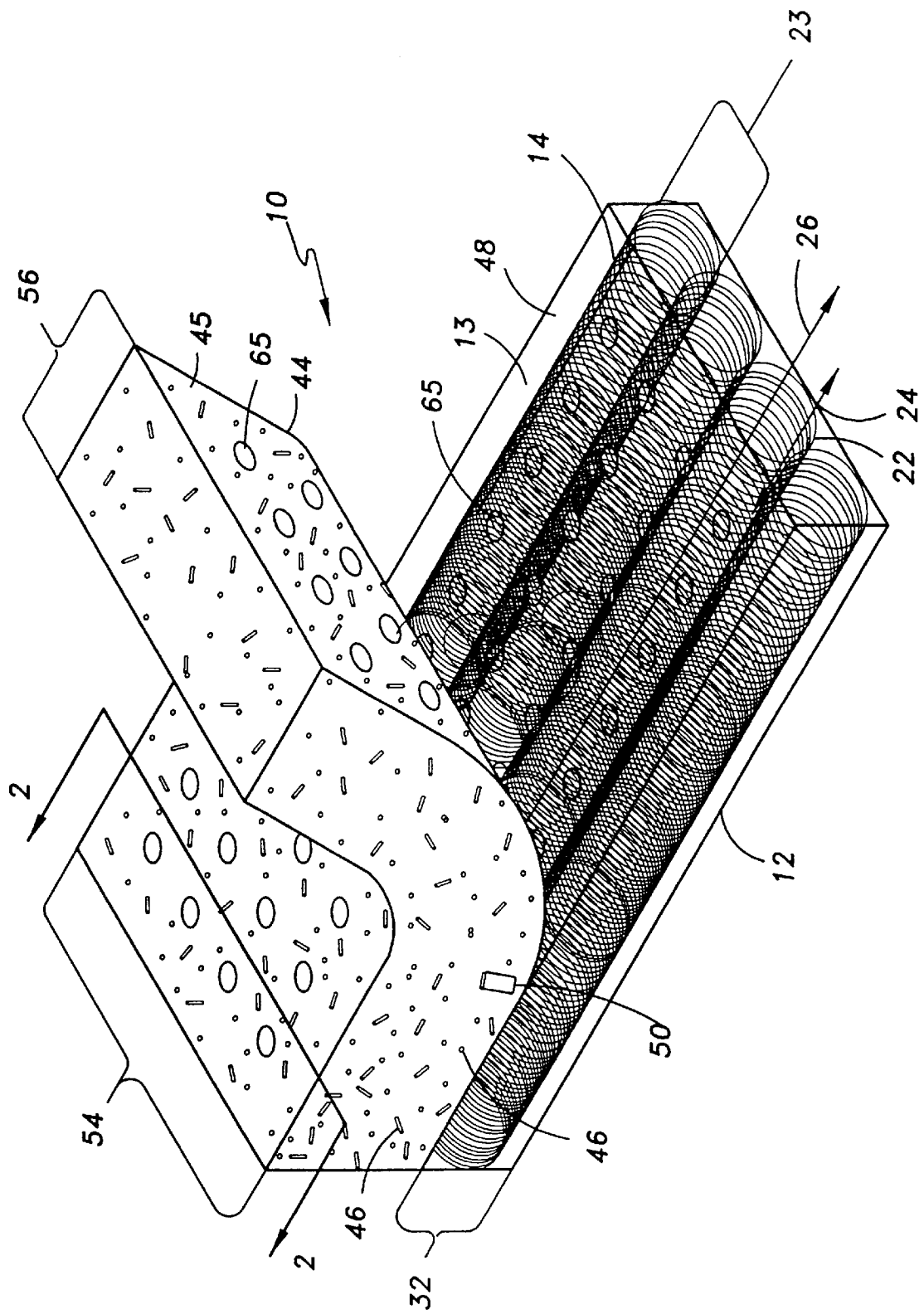
FIG. 1 is an enlarged schematic perspective view of a mat, according to the present invention.
Figure 2:
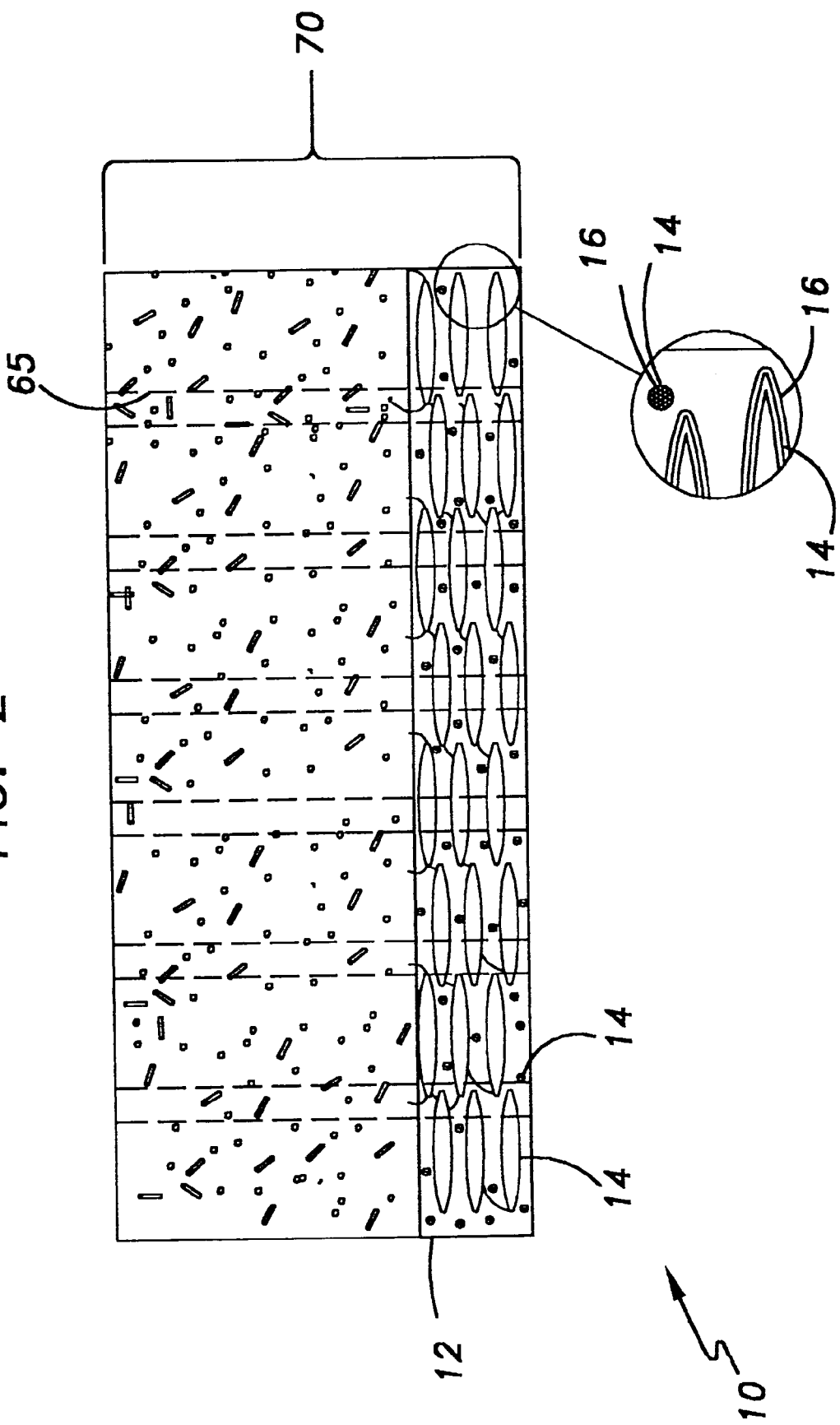
FIG. 2 is a cross sectional view of the mat of FIG. 1, taken along lines 2—2 of FIG. 1.

Referring to the drawings, wherein like numerals indicate like elements throughout, there is shown in FIGS. 1 through 2a a preferred embodiment of a mat, generally designated 10, in accordance with the present invention. The mat 10 comprises a primary, support layer 12 comprising a plurality of randomly oriented essentially continuous strands 14 of glass fibers 16.

As used herein, the term "fibers" means a plurality of individual filaments. The term "strand" as used herein refers to a plurality of fibers.

As used herein, the phrase "randomly oriented" means that the glass fiber strands 14 of the primary layer 12 are randomly oriented in at least two dimensions, for example by depositing the glass fiber strands 14 onto a carrier or conveyor 34 (shown in FIG. 5) in an array of interleaved layers 20 of generally circular, elongated elliptical and/or random loops 22, each of the loops 22 having a longitudinal axis 24 (shown in FIG. 1) positioned generally parallel to a longitudinal axis 26 of the mat 10. The diameter 23 of the loops 22 can range from about 150 to about 500 millimeters (about 6 to about 20 inches). Apparatus and methods for forming the primary layer 12 will be discussed in detail below.

As used herein, the phrase "essentially continuous" means that the glass fiber strands 14 can have a mean average length of about 50 to about 150 kilometers.

The primary layer 12 of the mat 10 comprises glass fibers, a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass fibers are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Continuous Glass Fibres*, (3d Ed. 1993) at pages 30–44, 47–60, 115–122 and 126–135, which are hereby incorporated by reference.

The glass fibers 16 can have a nominal filament diameter ranging from about 5.0 to about 24.0 micrometers (corresponding to a filament designation of D through U), and preferably have a nominal filament diameter ranging from about 5.0 to about 16.0 micrometers (D through M). For further information regarding nominal filament diameters and designations of glass fibers, see Loewenstein at page 25, which is hereby incorporated by reference.

Preferably, one or more coating compositions compatible with the thermosetting matrix material are present on at least a portion of the surfaces of the glass fibers to protect the surfaces from abrasion during processing. Non-limiting examples of suitable coating compositions include sizing compositions and secondary coating compositions. As used herein, the terms "size", "sized" or "sizing" refer to the aqueous composition applied to the filaments immediately after formation of the glass fibers. The term "secondary coating" refers to a coating composition applied secondarily to one or a plurality of strands after the sizing composition is applied, and preferably at least partially dried. As used herein, the phrase "compatible with the thermosetting matrix material" means that the components of the coating composition facilitate wetting of the matrix material upon the fiber strands and provide adequate physical properties in the composite.

The sizing composition preferably comprises one or more polymeric film forming materials which are compatible with the thermosetting matrix material. Non-limiting examples of suitable film-forming materials for use in the present invention include thermoplastic materials, thermosetting materials and mixtures thereof.

Examples of suitable thermoplastic and thermosetting film-forming materials include acrylic polymers, aminoplasts, alkyds, polyepoxides, phenolics, polyamides, polyolefins, polyesters, polyurethanes, vinyl polymers, derivatives and mixtures thereof.

Useful acrylic polymers include polymers or copolymers of monomers such as acrylic acid; methacrylic acid; esters of these acids such as acrylates, methacrylates, ethylacrylate, propylacrylate and butylacrylate; polyglycidyl acrylates and methacrylates; acrylamides and acrylonitriles. Non-limiting examples of commercially available acrylic polymers include FULATEX materials which are commercially available from H. B. Fuller Co. of St. Paul, Minn.; RHOPLEX E-693 and RHOPLEX TR-407 acrylic emulsions which are commercially available from Rohm and Haas of Philadelphia, Pa.; and CARBOSET acrylic polymers which are commercially available from B. F. Goodrich Co. of Toledo, Ohio.

Suitable acrylic polymers also include copolymers with unsaturated vinyl compounds such as styrene or vinyl acetate (such as VINOL products which are commercially available from Air Products and Chemicals, Inc. of Allentown, Pa.) and n-methylolacrylamide vinyl acetate copolymers such as are included in RESYN® 2828, an emulsion which is commercially available from National Starch and Chemical Co. of Bridgewater, N.J.

Useful aminoplasts include urea-formaldehyde and melamine formaldehyde such as RESIMENE 841 which is commercially available from Monsanto Co. of St. Louis, Mo. A non-limiting example of a phenolic suitable for use in the present invention is phenol formaldehyde.

Useful epoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. Examples of suitable commercially available epoxy film-forming polymers are EPON® 826 and 828 epoxy resins, which are epoxy functional polyglycidyl ethers of bisphenol A prepared from bisphenol-A and epichlorohydrin and are commercially available from Shell Chemical.

Useful polyamides include the VERSAMID products which are commercially available from General Mills Chemicals, Inc.

Suitable thermoplastic polyurethanes are condensation products of a polyisocyanate material and a hydroxyl-containing material such as polyol and include, for example, WITCOBOND® W-290H which is commercially available from Witco Chemical Corp. of Chicago, Ill. and RUCO 2011L which is commercially available from Ruco Polymer Corp. of Hicksville, N.Y. Suitable thermosetting polyurethanes include BAYBOND XW-110, which is commercially available from Bayer and other thermosetting polyurethanes which are commercially available from Bayer Corp. of Pittsburgh, Pa. and E.I. duPont de Nemours Co. of Wilmington, Del.

Non-limiting examples of useful vinyl polymers include RESYN 1971, RESYN 2828 and RESYN 1037 vinyl acetate copolymer emulsions which are commercially available from National Starch, and other polyvinyl acetates such as are commercially available from H. B. Fuller and Air Products and Chemicals Co. of Allentown, Pa. Other useful vinyl polymers include polyvinyl pyrrolidones such as PVP K-15, PVP K-30, PVP K-60 and PVP K-90, each of which are commercially available from ISP Chemicals of Wayne, N.J.

Non-limiting examples of useful polyolefins include polypropylene and polyethylene materials such as the polypropylene emulsion RL-5440, which is commercially available from Sybron Chemicals of Birmingham, N.J., and Polyemulsion CHEMCOR 43C30, which is commercially available from Chemical Corp. of America.

Non-limiting examples of useful polyester materials include RD-847A polyester resin which is commercially available from Borden Chemicals of Columbus, Ohio. Other suitable polyesters are STYPOL polyesters which are commercially available from Cook Composites and Polymers of Port Washington, Wis. and NEOXIL polyesters which are commercially available from DSM B.V. of Como, Italy.

Thermoplastic polyesters useful in the present invention include ethylene adipates (such as DESMOPHEN 2000) and ethylene butylene adipates (such as DESMOPHEN 2001KS), both of which are commercially available from Bayer of Pittsburgh, Pa.

The amount of film-forming material can be about 1 to about 90 weight percent of the sizing composition on a total solids basis, and is preferably about 60 to about 80 weight percent.

The sizing composition for the glass fiber strands of the present invention preferably comprises one or more glass fiber lubricants. Useful glass fiber lubricants include cationic, non-ionic or anionic lubricants and mixtures thereof. Generally, the amount of fiber lubricant can be about 1 to about 25 weight percent of the sizing composition on a total solids basis.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717, a partially amidated polyethylene imine commercially available from Henkel Corporation of Kankakee, Ill.

A useful alkyl imidazoline derivative is CATION X, which is commercially available from Rhone Poulenc of Princeton, N.J. Other useful lubricants include RD-1135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and PROTOLUBE HD high density polyethylene emulsion which is commercially available from Sybron Chemicals of Birmingham, N.J.

The sizing composition preferably also comprises one or more coupling agents selected from the group consisting of organo silane coupling agents, transition metal coupling agents, amino-containing Werner coupling agents and mixtures thereof. These coupling agents typically have dual functionality. Each metal or silicon atom has attached to it one or more groups which can react or compatibilize with the glass fiber surface and/or the components of the sizing composition. As used herein, the term "compatibilize" with respect to coupling agents means that the groups are chemically attracted, but not bonded, to the glass fiber surface and/or the components of the sizing composition, for example by polar, wetting or salvation forces. Examples of hydrolyzable groups include:

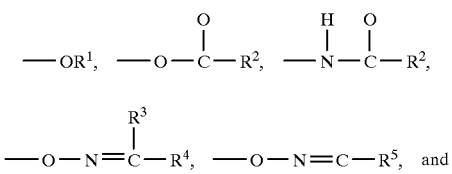

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include A-187 gamma-glycidoxypropyltrimethoxysilane, A-174 gamma-methacryloxypropyltrimethoxysilane and A-1100 gamma-aminopropyltriethoxysilane silane coupling agents, each of which are commercially available from OSi Specialties, Inc. of Tarrytown, N.Y. The organo silane coupling agent can be at least partially hydrolyzed with water prior to application to the glass fibers, preferably at about a 1:3 stoichiometric ratio or, if desired, applied in unhydrolyzed form.

Suitable transition metal coupling agents include titanium, zirconium and chromium coupling agents. The amount of coupling agent can be 1 to about 10 weight percent of the sizing composition on a total solids basis.

Crosslinking materials, such as the aminoplasts discussed above, can also be included in the sizing composition. Non-limiting examples of suitable crosslinkers include melamine formaldehyde, blocked isocyanates such as BAYBOND XW 116 or XP 7055, epoxy crosslinkers such as WITCOBOND XW by Witco Corp., and polyesters such as BAYBOND XP-7044 or 7056. The BAYBOND products are commercially available from Bayer of Pittsburgh, Pa. The amount of crosslinker can be about 1 to about 25 weight percent of the sizing composition on a total solids basis.

The sizing composition can include one or more emulsifying agents for emulsifying components of the sizing composition. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils. Generally, the amount of emulsifying agent can be about 1 to about 20 weight percent of the sizing composition on a total solids basis.

The sizing composition can also include one or more aqueous dispersible or soluble plasticizers to improve flexibility. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. An example of an aqueous soluble plasticizer is CARBOWAX 400, a polyethylene glycol which is commercially available from Union Carbide of Danbury, Conn. The amount of plasticizer is more preferably less than about 5 weight percent of the sizing composition on a total solids basis.

Fungicides, bactericides and anti-foaming materials and organic and/or inorganic acids or bases in an amount sufficient to provide the aqueous sizing composition with a pH of about 2 to about 10 can also be included in the sizing composition. Water (preferably deionized) is included in the sizing composition in an amount sufficient to facilitate application of a generally uniform coating upon the strand. The weight percentage of solids of the sizing composition generally can be about 5 to about 20 weight percent.

Preferred sizing compositions are disclosed in assignee's U.S. Pat. No. 4,927,869 and PCT Application WO 95/09133, which are hereby incorporated by reference. Non-limiting examples of other suitable sizing compositions are set forth in Loewenstein at pages 237–291, which are hereby incorporated by reference.

The sizing can be applied in many ways, for example by contacting the filaments with a static or dynamic applicator, such as a roller or belt applicator, spraying or other means. For a discussion of suitable applicators, see Loewenstein at pages 165–172, which is hereby incorporated by reference.

The sized fibers are preferably dried at room temperature or at elevated temperatures to remove excess moisture from the fibers and, if present, cure any curable sizing or secondary coating composition components. Drying of glass fiber forming packages or cakes is discussed in detail in Loewenstein at pages 219–222, which is hereby incorporated by reference. For example, the forming package can be dried in an oven at a temperature of about 104° C. (220° F.) to about 160° C. (320° F.) for about 10 to about 24 hours to produce glass fiber strands having a dried residue of the composition thereon. The temperature and time for drying the glass fibers will depend upon such variables as the percentage of solids in the sizing composition, components of the sizing composition and type of glass fiber. The sizing is typically present on the fibers in an amount ranging from about 0.5 percent to about 2.5 percent by weight after drying.

While not preferred, after drying the sized glass strands can be gathered together into bundles or strands 14 of generally parallel fibers 16 or roving and can be further treated with the secondary coating composition which is different from the sizing composition. The secondary coating composition can include one or more of the components of the sizing composition discussed above, and is preferably aqueous-based.

The secondary coating composition is applied to at least a portion of the surface of the strands in an amount effective to coat or impregnate the portion of the strands. The secondary coating composition can be conventionally applied by dipping the strand in a bath containing the composition, by spraying the composition upon the strand or by contacting the strand with a static or dynamic applicator such as a roller or belt applicator, for example. The coated strand can be passed through a die to remove excess coating composition from the strand and/or dried as discussed above for a time sufficient to at least partially dry or cure the secondary coating composition The glass fiber strands 14 can comprise about 1 to about 100 weight percent of the primary layer 12 of the mat 10 on a total solids basis, and preferably about 50 to about 100 weight percent.

Figure 3:
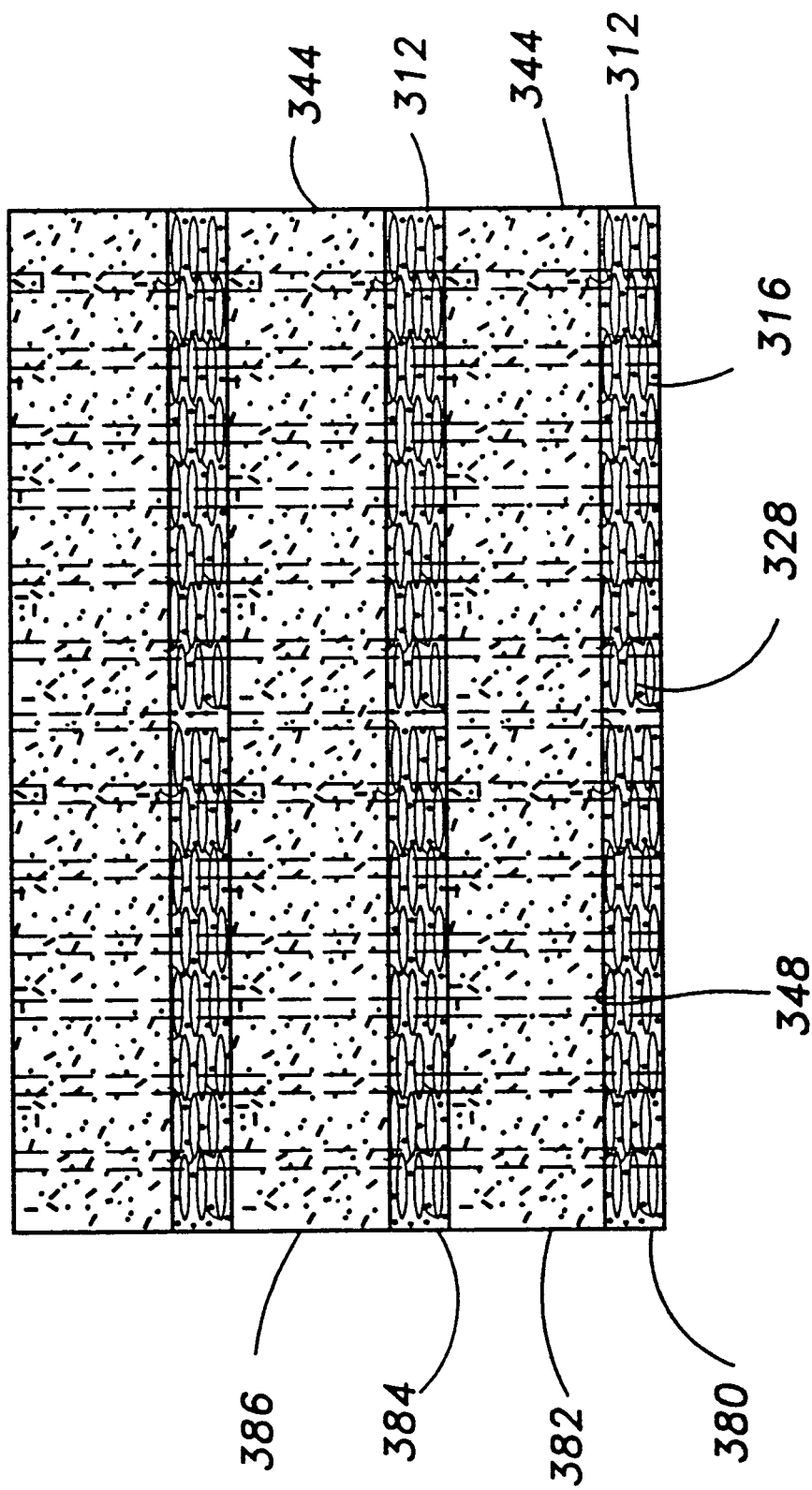
FIG. 3 is a schematic cross sectional view of an alternative embodiment of a mat, according to the present invention.

In an alternative embodiment shown in FIG. 3, the primary layer 312 can comprise a plurality of randomly oriented essentially continuous polymeric strands or fibers 328, in addition to or in lieu of the glass fibers. The polymeric fibers 328 can be formed from one or more polymeric materials which are compatible with the thermosetting matrix material, i.e., the polymeric fibers 328 will retain their tensile integrity and not dissolve into the thermosetting matrix material. Thermosetting polyester and vinyl ester matrix materials often include a reactive diluent such as styrene, divinyl benzene or methyl methacrylate. It is preferred that the polymeric fibers 328 not appreciably soften, swell or dissolve in such reactive diluents.

Suitable man-made polymeric fibers can be formed from a fibrous or fiberizable material prepared from natural organic polymers, synthetic organic polymers or inorganic substances. Polymeric fibers believed to be useful in the present invention are discussed at length in the *Encyclopedia of Polymer Science and Technology*, Vol. 6 (1967) at pages 505–712, which is hereby incorporated by reference. As used herein, the term "fiberizable" means a material capable of being formed into a generally continuous filament, fiber, strand or yarn.

Suitable man-made fibers include synthetic polymers such as polyamides, polyesters, acrylics, polyolefins, polyurethanes, vinyl polymers, derivatives and mixtures thereof. See *Encyclopedia of Polymer Science and Technology*, Vol. 6 at 506.

Suitable man-made fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology*, Vol. 6 at 507–508.

Non-limiting examples of useful polyamide fibers include nylon fibers such as nylon 6 (a polymer of caprolactam), nylon 6,6 (a condensation product of adipic acid and hexamethylenediamine), nylon 12 (which can be made from butadiene) and nylon 10. Many of these nylons are commercially available from E.I. duPont de Nemours and Company of Wilmington, Del. and BASF Corp. of Parsippany, N.J. Other useful polyamides include polyhexamethylene adipamide, polyamide-imides and aramids such as KEVLAR™, which is commercially available from duPont.

Thermoplastic polyester fibers useful in the present invention include those composed of at least 85% by weight of an ester of a dihydric alcohol and terephthalic acid, such as polyethylene terephthalate (for example DACRON™ which is commercially available from duPont and FORTREL™ which is commercially available from Hoechst Celanese Corp. of Summit, N.J.) and polybutylene terephthalate.

Fibers formed from acrylic polymers believed to be useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. See *Encyclopedia of Polymer Science and Technology*, Vol. 6 at 559–561. A non-limiting example of a suitable acrylic polymer fiber is ORLON™, a copolymer which contains at least 85% acrylonitrile which is commercially available from duPont.

Useful polyolefin fibers are generally composed of at least 85% by weight of ethylene, propylene, or other olefins. See *Encyclopedia of Polymer Science and Technology*, Vol. 6 at 561–564.

Fibers formed from vinyl polymers believed to be useful in the present invention can be formed from polyvinyl chloride, polyvinylidene chloride (such as SARAN™, which is commercially available from Dow Plastics of Midland, Mich.), polytetrafluoroethylene, and polyvinyl alcohol (such as VINYLON™, a polyvinyl alcohol fiber which has been crosslinked with formaldehyde).

Further examples of thermoplastic fiberizable materials believed to be useful in the present invention are fiberizable polyimides, polyether sulfones, polyphenyl sulfones; polyetherketones, polyphenylene oxides, polyphenylene sulfides and polyacetals.

It is understood that blends or copolymers of any of the above materials and combinations of fibers formed from any of the above materials can be used in the present invention, if desired.

The polymeric fibers 328 of the primary layer 312 can comprise about 1 to about 100 weight percent (in the alternative embodiment) of the primary layer 312 on a total solids basis, and preferably about 1 to about 50 weight percent.

Other inorganic fibers such as polycrystalline fibers, ceramics including silicon carbide, and carbon or graphite can be used in the primary layer 12 of the mat 10 of the present invention. Such fibers are discussed in the *Encyclopedia of Polymer Science and Technology*; Vol. 6 at 610–690.

The primary layer 12 generally comprises about 1 to about 20 weight percent of the mat 10 on a total solids basis, preferably comprises about 1 to about 10 weight percent, and more preferably comprises about 1 to about 5 weight percent of the mat 10 on a total solids basis.

Figure 5:
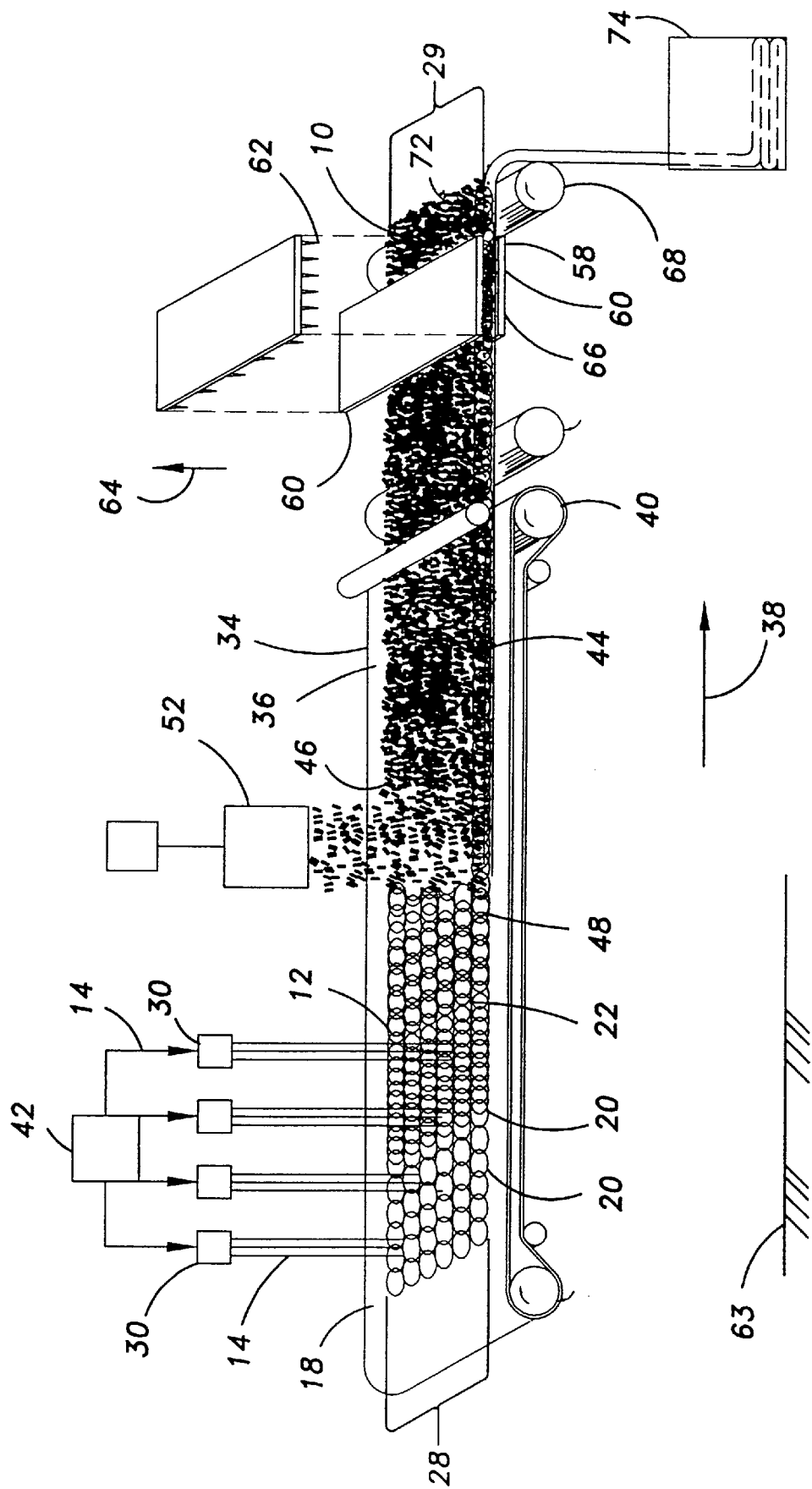
FIG. 5 is a schematic perspective view of a system for forming a mat according to the present invention.

Referring to FIG. 5, the width 28 of the primary layer 12 (which corresponds generally to the overall width 29 of the mat 10) can range from about 0.6 to about 3 meters (about 24 to about 120 inches), and preferably ranges from about 1.2 to about 2.4 meters (about 48 to about 96 inches).

The length of the primary layer 12 can vary based upon such factors as the desired length of the product to be transported to the customer. The mat 10 is preferably formed by a generally continuous process as discussed below. Preferably, the length of the primary layer 12 ranges from about 60 to about 300 meters (about 200 to about 1000 feet), and more preferably about 180 to about 275 meters (about 600 to about 900 feet).

Referring now to FIG. 1, the thickness 32 of the primary layer 12 can range from about 3 to about 25 millimeters (about 0.125 to about 1 inch), and preferably ranges from about 10 to about 25 millimeters.

The surface weight of the primary layer 12 of the mat can range from about 30 to about 487 grams per square meter (about 0.1 to about 1.6 ounces per square foot) prior to depositing the secondary layer thereon and needling.

Preferably, the primary layer 12 is not treated or coated with any adhesive or polymeric binder material to promote consolidation of the mat 10, although such binders can be used in accordance with the present invention. Non-limiting examples of useful polymeric binders include polyvinyl acetate, polyesters and chemically-coupled polypropylene. Suitable polymeric binders can be in the form of a powder, fiber or emulsion, as desired. The binders are consolidated with the mat by the application of heat and pressure, such as by passing the mat between heated calendering rolls.

Also, an antistatic agent for example an amine, amide or quaternary salt such as soyadimethyl and ethylammonium ethosulfate can be applied to the strands 14 prior to deposition upon the conveyor, if desired.

Referring now to FIG. 5, the primary layer 14 can be formed, for example, by positioning a plurality of strand feeders 30 above a conveyor 34, the surface 36 of which is driven in a direction 38 by a pair of spaced drive rollers 40 which are rotated by a motor (not shown). The surface 36 of the conveyor 34 can be generally smooth or foraminous, such as a chain mesh. Useful conveyors 34 are well known to those skilled in the art and are discussed further below.

Each strand feeder 30 is supported for reciprocating movement above the conveyor 34. The movement of each strand feeder 30 is generally transverse to the direction 38 of motion of the conveyor 34. Each strand feeder 30 receives strands 14 from a strand supply 42 and feeds the strands 14 by way of an endless belt between spaced driven pulling wheels. The pulled strands 14 are fed against a deflector plate structured to deposit the strands 14 onto the conveyor 34 as a plurality of loops 22. The strand feeders 30 are continuously traversed across the width of the conveyor such that the loops 22 are deposited across the predetermined width 28 of the primary layer 12 to be formed.

The number of strand feeders 30 can range from 1 to about 20, and preferably ranges from about 6 to about 20. Four strand feeders 30 are shown in FIG. 5. A non-limiting example of a strand feeder useful in the present invention is disclosed in assignee's U.S. Pat. No. 4,615,717, which is hereby incorporated by reference. Preferably the strand feeder 30 includes a stationary deflector plate.

Preferably, the strand supply 42 is a plurality of forming or supply packages mounted upon a creel. Conventional creels suitable for use in the present invention are shown in Loewenstein at page 315, which is hereby incorporated by reference. The supply packages can be wound such that the strand 14 can be withdrawn from the inside of the supply package or from the outside of the supply package (known in the art as "filling wind"). The dimensions of the supply package can vary, depending upon such variables as the diameter and type of fiber wound thereon, and are generally determined by convenience for later handling and processing. Generally, supply packages are about 15.2 to about 76.2 centimeters (about 6 to about 30 inches) in diameter and have a length of about 12.7 to about 101.6 centimeters (about 5 to about 40 inches).

In an alternative embodiment, the strand supply 42 is a fiber forming apparatus which comprises a glass melting furnace or forehearth containing a supply of a fiber forming mass or molten glass and having a precious metal bushing or spinneret attached to the bottom of the forehearth. The bushing is provided with a series of orifices in the form of tips through which molten glass is drawn in the form of individual fibers 16 or filaments at a high rate of speed. Such fiber forming apparatus are well known to those skilled in the art and further discussion thereof is not believed to be necessary in view of the present disclosure. Suitable fiber forming apparatus are discussed in Loewenstein at pages 22–27 and 119–151, which are hereby incorporated by reference.

The glass fibers 16 can be cooled by spraying with water (not shown) and then coated with a sizing by an applicator, such as a graphite roll applicator. After application of the sizing, the glass fibers 16 are gathered by an alignment device which aligns each of the fibers 16 to form one or more strands 14 in which each of the fibers 16 is generally adjacent and coplanar (in side-by-side or generally parallel alignment). Non-limiting examples of suitable alignment devices include rotatable or stationary gathering shoes or a comb, as discussed in Loewenstein at page 173, which is hereby incorporated by reference. Preferably, the number of strands 14 ranges from 1 to about 10 strands and, more preferably, 1 to about 6 strands.

Alternatively, the fiber forming apparatus can be, for example, a forming device for synthetic textile fibers or strands, the methods and apparatus for which are discussed in detail above.

The strands 14 are pulled from the strand supply 42 by the corresponding strand feeders 30 and dispensed back and forth upon the moving surface 36 of the conveyor 34 such that the strands 14 are randomly oriented in at least two dimensions in an array of interleaved layers 20 of generally circular, elongated elliptical and/or random loops 22 to form the primary layer of the mat 10, as discussed above. The strand feeders 30 are controlled to form a mat 10 having strands 14 oriented in a predetermined pattern and having a generally constant width and thickness which can be controlled by varying the speed at which the conveyor surface 36 or strand feeders 30 move. The speed at which the conveyor surface 36 is moved can range from about 3 to about 9 meters per minute (about 10 to about 30 feet per minute). The speed at which the strand feeders 30 are moved can range from about 50 to about 150 centimeters per second (about 20 to about 60 inches per second).

Useful apparatus and processes for forming a mat of continuous strands is disclosed in assignee's U.S. Pat. Nos. 3,883,333, 4,404,717, 4,615, 717, 4,692,375 and 4,995,999 which are hereby incorporated by reference.

Referring now to FIGS. 1 and 5, the mat 10 comprises one or more secondary layers 44 deposited upon an upper surface 48 of the primary layer 12 such that a first side 45 of the secondary layer 44 is adjacent to a second side 13 of the primary layer 12. Each secondary layer 44 comprises a plurality of fiber strands 46 of discontinuous lengths. The fiber strands 46 preferably have a mean average length 50 ranging from about 20 to about 125 millimeters (about 0.75 to about 5 inches), and more preferably about 25 to about 100 millimeters.

The strands 46 can be formed from one or more materials such as are disclosed above as being suitable for forming the strand 14 of the primary layer 12. The strands 46 are preferably glass fiber strands such as are discussed above, although the strands can be a combination of glass fiber strands and polymeric strand(s) such as are discussed above.

The chopped glass fiber strands 46 can comprise about 95 to about 100 weight percent of the secondary layer 44 of the mat 10 on a total solids basis, and preferably about 98 to about 100 weight percent. If polymeric fibers are present, the fibers can comprise about 1 to about 10 weight percent of the secondary layer 44 of the mat 10 on a total solids basis.

Preferably the strands 46 are formed from generally continuous strands which are chopped into discontinuous or discrete lengths 50 by a chopper 52. As shown in FIG. 5, the chopper 52 can be positioned proximate the conveyor 34 at a predetermined distance from the strand feeders 30 in the direction 38 such that chopped strands 46 ejected from the chopper 52 are deposited upon the upper surface 48 of the primary layer 12 of generally continuous strands 14. Alternatively, the strands 46 can be chopped at a location spaced apart from and remote to the mat forming apparatus and transported to the mat forming apparatus.

Preferably the chopped strand 46 in the secondary layer 44 comprises about 80 to about 99 weight percent of the mat 10 on a total solids basis, preferably comprises about 90 to about 99 weight percent, and more preferably comprises about 95 to about 99 weight percent of the mat 10 on a total solids basis.

The width 54 of the secondary layer 44 (which can be greater than or correspond generally to the overall width 29 of the mat 10) can range from about 0.6 to about 3 meters (about 24 to about 120 inches), and preferably ranges from about 1.2 to about 2.4 meters (about 48 to about 96 inches).

The length of the secondary layer 12 corresponds generally to the length of the primary layer 12.

The thickness 56 of the secondary layer 44 can range from about 5 to about 75 millimeters (about 0.25 to about 3 inches) prior to needling. The surface weight of the secondary layer 44 of the mat 10 can range from about 305 to about 3056 grams per square meter prior to needling (about 1 to about 10 ounces per square foot)

Preferably the chopper 52 dispenses about 2.8 to about 280 grams per minute per linear millimeter width (about 30 to about 300 ounces per minute per linear foot width). The amount of chopped strand 46 per unit area deposited upon the primary layer 12 is also a function of the conveyor speed.

Non-limiting examples of suitable choppers 52 include the Model 90 and 120 inch extra wide cutters which are commercially available from Finn and Fram, Inc. of California.

The chopped strands 46 of the secondary layer 44 preferably have on at least a portion of the surfaces thereof the essentially dried residue of a second coating or sizing composition. The second coating composition can be the same or different from the coating composition applied to the strands 14 of the primary layer 12 ("first coating composition") discussed in detail above. The components of the second coating composition can be any of the components discussed above with respect to the first coating composition. While the components of the second coating composition can be the same and of the same amount as those first coating composition, one skilled in the art would understand that different components and/or different amounts of components can be selected for the second coating composition. Preferably, the second coating composition comprises a film-forming material, a glass fiber lubricant and a coupling agent as discussed above.

Referring now to FIG. 3, there is shown a mat 310 comprising alternating primary layers 312 and secondary layers 344. Such a mat 310 can be formed by forming a mat 10 having a primary layer 12 and secondary layer 44 such as discussed above and stacking a plurality of mats 10 prior to needling, for example.

The number of primary layers 312 and secondary layers 344 can vary as desired, and can be a function of cost and the desired overall mat thickness. The number of layers 312, 344 can range from 1 to about 5. Three primary layers 312 and three secondary layers 344 are shown in FIG. 3. Alternatively, the mat 310 can comprise a different number of primary layers 312 than secondary layers 344, so long as at least one secondary layer 344 is positioned upon the upper surface 348 of at least one primary layer 312 since the primary layer 312 provides support for the mat 310 during transportation.

In an alternative embodiment the mat can include engineered knit or woven fabrics or woven roving within or between the primary layers 12 and secondary layers 44.

Referring now to FIG. 5, the strands 14 of the primary layer 12 are entangled with the chopped strands 46 of the secondary layer 44 by needling the layers 12, 44 together. The needling can be accomplished by passing the mat 10 through a needler 58 between generally known spaced needling boards 60, such as are disclosed in assignee's U.S. Pat. No. 4,277,531, which is hereby incorporated by reference. A plurality of spaced needles 62 are used to entangle or intertwine the fibers 16 of the mat 10 to impart mechanical strength and integrity to the mat 10. The needles 62 are constructed and arranged with a barb which entangles the strands 14 contained in the mat 10 as the needles 62 pass through the mat 10 forming aperture 65 on the downward stroke of the vertical reciprocation of the needles 62 and preferably release the fibers 16 contained within the mat 10 during the upward stroke of the reciprocating needler. Alternatively, needles with reverse barbs can be used to form the mat of the present invention. As used herein, the term "horizontal(ly)" means that the direction of movement is generally parallel with respect to ground 63. As used herein, the term "vertical(ly)", "downwardly" and "upwardly" refer to direction of movement which is generally perpendicular with respect to ground 63.

During vertical upward movement 64, the needles 62 are passed through a plurality of generally cylindrical orifices in a metal stripper plate (not shown for clarity in the drawings) which rests upon the mat 10 during its passage throughout the needler 58. The strands 14 are thus pulled from the surface of the barb as the mat 10 proceeds in horizontal direction 38 after a stroke of the needle 62 in a downward and upward direction. The mat 10 passes over a metal bed plate 66 having a plurality of generally cylindrical orifices therethrough aligned with the orifices of the stripper plate through which the needles 62 pass on the downward stroke of the needleboard 60.

The needleboard 60 can be reciprocated such that a full stroke (downward and upward motion) occurs in a period of about 100 to about 1000 strokes per minute and upon completion of each reciprocation rolls 68 are provided in association with the needler 58 to move the mat 10 in generally horizontal direction 38 in preparation for the successive downward stroke of the needleboard 60.

A non-limiting example of a suitable needling machine is Model NL 9 which is commercially available from Textilmaschinenfabrik Dr. Ernest Fehrer AG of Germany.

Figure 4:
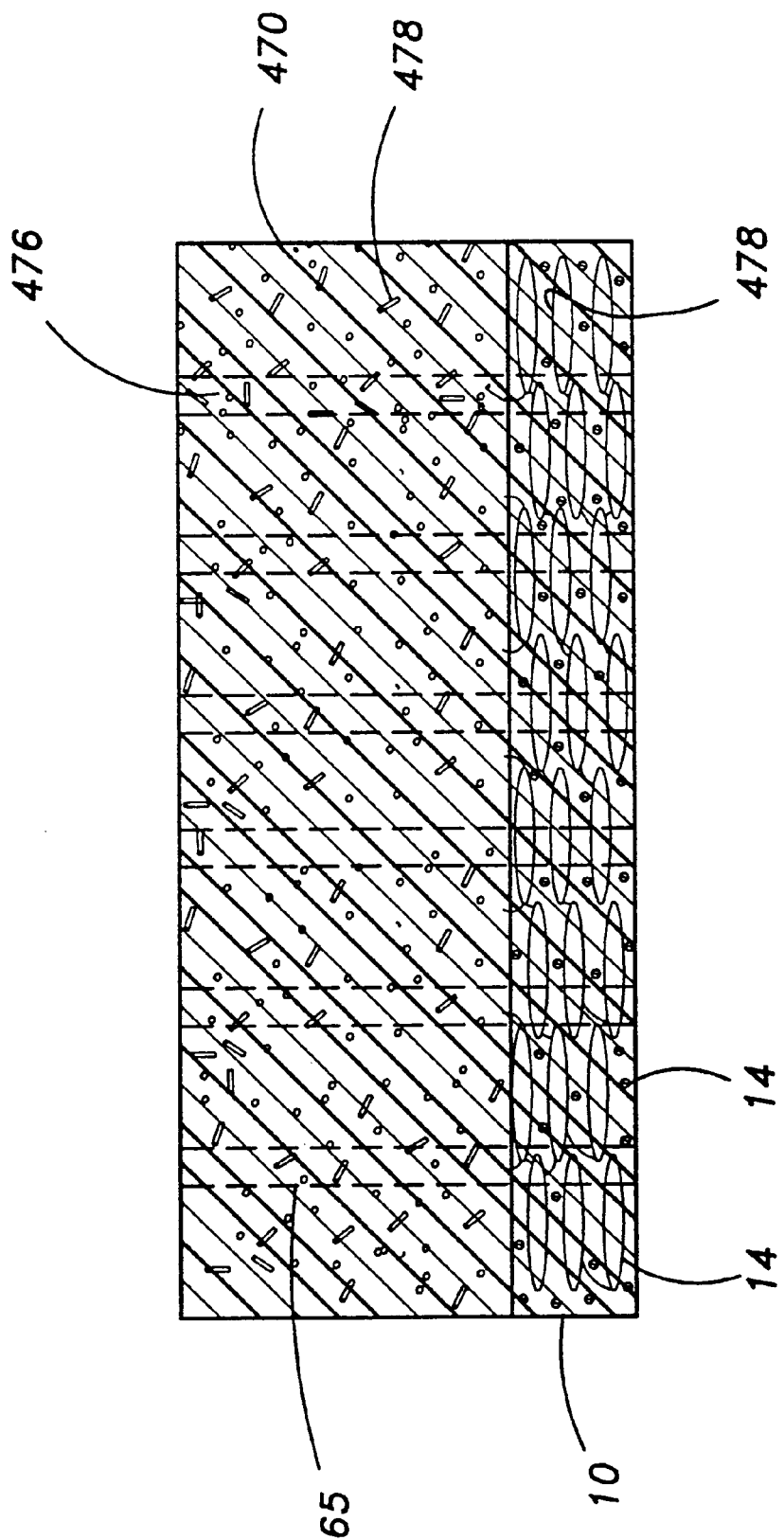
FIG. 4 is an enlarged schematic cross sectional view of a composite according to the present invention.

The length of the needle 62, the depth of the penetration of the needle 62 through the mat 10 during its passage through the needler 58 and the extent to which the fibers 16 entangled in the barb of the needle 62 are moved in a generally vertical upward direction 64 through the mat 10 during the upward stroke of the needler 58 determine the extent to which impact strength can be imparted to the composite 470 (shown in FIG. 4) incorporating the mat 10 as reinforcement.

Preferably, the gauge of the needle 62 ranges from about 32 to about 19 gauge, with a combination of 25 and 32 gauge needles being preferred. The punch density is preferably about 12 to about 31 punches per square centimeter (about 75 to about 200 punches per square inch).

The punching depth or degree of penetration of the needles into the orifices of the bed plate 66 preferably ranges from about 12 to about 18 millimeters (about 0.5 to about 0.7 inches). In a typical needling process, the mat 10 entering the needler 58 can have an overall average thickness of about 8 to about 100 millimeters. After passage throughout the needler 58, the mat 10 can have a compressed overall average thickness 70 of about 3 to about 20 millimeters (about 0.125 to about 0.75 inches). The needling process is described in further detail in assignee's U.S. Pat. No. 4,335,176, which is hereby incorporated by reference.

The surface weight of the mat 10 after needling can range from about 305 to about 3058 grams per square meter (about 1 to about 10 ounces per square foot). The overall width 29 of the mat 10 can range from about 0.6 to about 3 meters (about 24 to about 120 inches), and preferably ranges from about 1.2 to about 2.4 meters (about 48 to about 96 inches).

An advantage of such a mat 10 is that it can be readily handled after formation and packaged in a convenient form for transportation to a customer. For example, as shown in FIG. 5, the mat 10 can be rolled to form a roll 72 or festooned or severed into predetermined lengths and packaged in a conventional container 74 of suitable dimensions for shipment to the customer.

The mat 10 can be used to reinforce a thermosetting matrix material 476 to form a polymeric composite 470, by any method known in the art, for example by open lay-up molding using resin and glass fiber spray-up equipment, preforms for press molding, sheet molding and dough molding, pultrusion, filament winding and panel formation processes. The preferred method for forming a composite 470 of the present invention is by sheet molding.

Thermosetting matrix materials 476 useful in the present invention can include thermosetting polyesters, vinyl esters, epoxides, phenolics, aminoplasts, thermosetting polyurethanes, derivatives and mixtures thereof.

Suitable thermosetting polyesters include the AROPOL products which are commercially available from Ashland Chemical Inc. of Columbus, Ohio. Examples of useful vinyl esters include DERAKANE® products such as DERAKANE® 470-45, which are commercially available from Dow Chemical USA of Midland, Mich.

Useful epoxides are discussed in detail above. Examples of suitable commercially available epoxides are EPON® 826 and 828 epoxy resins, which are epoxy functional polyglycidyl ethers of bisphenol A prepared from bisphenol-A and epichlorohydrin and are commercially available from Shell Chemical.

Non-limiting examples of suitable phenolics include phenol-formaldehyde and RESIMENE 841 melamine formaldehyde from Monsanto. Useful aminoplasts include urea-formaldehyde and melamine formaldehyde. Suitable thermosetting polyurethanes include BAYBOND XW-110, which is commercially available from Bayer and other thermosetting polyurethanes which are commercially available from Bayer and E.I. duPont de Nemours Co. of Wilmington, Del.

Other components which can be included with the thermosetting matrix material 476 and reinforcing mat 10 in the composite 470 are, for example, colorants or pigments, lubricants or process aids, ultraviolet light (UV) stabilizers, antioxidants, other fillers, and extenders.

The mat 10, 410 and thermosetting matrix material(s) 476 can be formed into a composite 470 by a variety of methods which are dependent upon such factors as the type of thermosetting matrix material 476 used. Thermosetting matrix materials can be cured by application of heat. The temperature and curing time for the thermosetting matrix material depends upon such factors as the type of thermosetting matrix material used, other additives in the matrix system and thickness of the composite, to name a few.

A method according to the present invention for making a mat adapted to reinforce a thermosetting matrix material will now be described generally.

With reference to FIG. 5, the method generally comprises the initial step of dispersing a plurality of essentially continuous glass fiber strands 14 to form a primary layer 12, such that the glass fiber strands 14 of the primary layer 12 are randomly oriented as discussed above. The strands 14 are preferably dispersed by one or more strand feeders 30 in a manner such as is discussed in detail above.

A plurality of chopped glass fiber strands 46 is dispersed upon the upper surface 48 of the primary layer 12, the strands 46 having a mean average length such as is discussed above. The strands 46 can be dispersed onto the primary layer 12 from a chopper 52 in a manner such as is discussed in detail above.

The essentially continuous glass fiber strands 14 of the primary layer 12 are entangled with the chopped glass fiber strands 46 of the secondary layer 44 by needling the layers 12, 44 together to form the mat 10, 410. Suitable needlers and the methods for needling are discussed in detail above.

A method according to the present invention for reinforcing a thermosetting matrix material to form a reinforced composite will now be described generally. The method generally comprises the initial step of dispersing a plurality of essentially continuous glass fiber strands 14 to form a primary layer 12, such that the glass fiber strands 14 of the primary layer 12 are randomly oriented, as discussed above. A plurality of chopped glass fiber strands 46 is dispersed upon the upper surface 48 of the primary layer 12, the mean average length of the chopped glass fiber strands 46 and method and apparatus for dispersing such strands 46 being discussed in detail above.

The essentially continuous glass fiber strands 14 of the primary layer 12 are entangled with the chopped glass fiber strands 46 of the secondary layer 44 by needling the layers 12, 44 together to form the mat 10, 410. Suitable needlers 58 and the method for needling are discussed in detail above.

At least a portion 478 of the mat 10 is coated and impregnated with the thermosetting matrix material 476. The thermosetting matrix material 476 is at least partially cured to form the reinforced composite 470, preferably by the application of heat or a curing agent such as discussed above.

The present invention will now be illustrated by the following specific, non-limiting examples.

EXAMPLE 1

The aqueous sizing composition of Table 1 was prepared, applied to H filament E-glass fibers and the fibers were gathered into bundles of about 130 fibers per bundle and wound onto individual forming packages in a manner similar to that discussed above in the specification. The weight of sizing composition on the fibers after drying the forming package at a temperature of about 140° C. for about 10 hours was about 0.6 weight percent, i.e., loss on ignition. These fibers were used to form a primary layer of mat according to the present invention, as discussed below.

TABLE 1

| COMPONENT | Weight of Component per unit of aqueous sizing composition grams per gallon |
|---|---|
| unsaturated, essentially linear polyester polymer[1] | 143 |

TABLE 1-continued

| COMPONENT | Weight of Component per unit of aqueous sizing composition grams per gallon |
|---|---|
| partially amidated polyethylene imine[2] | 3.17 |
| gamma-methacryloxypropyltrimethoxysilane[3] | 11 |
| gamma-aminopropyltriethoxysilane[4] | 5.5 |
| acetic acid | 2.4 |
| water | 1362 |

[1]NEOXIL 966D aqueous solution of unsaturated, essentially linear polyester polymer which is commercially available from DSM Co. of Italy.
[2]ALUBRASPIN 226 partially amidated polyethlene imine which is available from PPG Industries, Inc.
[3]A-174 gamma-methacryloxypropyltrimethoxysilane which is commercially available from OSi Specialties, Inc. of Danbury, Connecticut.
[4]A-1100 gamma-aminopropyltriethoxysilane which is commercially available from OSi Specialties, Inc. of Danbury, Connecticut.

The aqueous sizing composition of Table 2 was prepared, applied to K filament E-glass fibers and the fibers were gathered into bundles of about 300 fibers per bundle and wound onto individual forming packages in a manner similar to that discussed above in the specification. The weight of sizing composition on the fibers after drying the forming package at a temperature of about 140° C. for about 10 hours was about 2.15 weight percent, i.e., loss on ignition. These fibers were used to form a secondary layer of mat according to the present invention, as discussed below.

TABLE 2

| | Weight of Component per unit of aqueous sizing composition | |
|---|---|---|
| COMPONENT | grams per gallon | grams per liter |
| unsaturated, essentially linear polyester polymer[5] | 204 | 53.9 |
| polyvinyl acetate copolymer emulsion[6] | 516 | 136 |
| polyethylene polymer emulsion[7] | 50 | 13.2 |
| polyamide[8] | 9.1 | 2.4 |
| polyoxyethylene polymer[9] | 18.2 | 4.8 |
| gamma-methacryloxypropyltrimethoxysilane[10] | 18.2 | 4.8 |
| gamma-aminopropyltriethoxysilane[11] | 9.1 | 2.4 |
| acetic acid | 4.5 | 1.2 |
| water | 2955 | 781 |

[5]STYPOL 044-7009 aqueous solution of unsaturated, essentially linear polyester polymer which is commercially available from Cook Composites & Chemicals Co. of Port Washington, Wisconsin.
[6]FULATEX PN 3133-M aqueous emulsion of polyvinyl acetate copolymer which is commercially available from Fuller Chemical Company of St. Paul, Minnesota.
[7]PROTOLUBE HDA aqueous emulsion of polyethlene polymer whichis commercially available from Sybron Chemicals of Wellford, South Carolina.
[8]VERSAMID 140 polyamide which is commercially available from Henckel.
[9]POLYOX WSR-301 polyoxyethylene polymer which is commercially available from Union Carbide of Danbury, Connecticut.
[10]A-174 gamma-methacryloxypropyltrimethoxysilane which is commercially available from OSi Specialties, Inc. of Danbury, Connecticut.
[11]A-1100 gamma-aminopropyltriethoxysilane which is commercially available from OSi Specialties, Inc. of Danbury, Connecticut.

The mat had a primary layer of about 4 weight percent continuous strand and a secondary layer of about 96 weight percent chopped strand (mean average length of about 25 millimeters).

The above mat (Example A) and samples of 5509 roving (Control A) which is commercially available from PPG Industries, Inc. having the sizing composition as set forth in Table 2 and chopped to a mean average length of about 25 millimeters were used to produce sheet molding compound (SMC) composites with various thermosetting matrix materials.

Samples of the composites were molded at 149° C. (300° F.) for 150 seconds at about 7.0 MPa (1000 psi) to produce about 400×400×2.5 millimeters (16×16×0.100 inches) plaques. Three plies of mat were used to prepare the composite samples reinforced with the mat. Each specimen was evaluated for: tensile strength according to ASTM Method D-638; flexural strength and flexural modulus according to ASTM Method D-790; Izod impact strength according to ASTM Method D-256 at 30 weight percent glass content.

Table 4 present the results of tests conducted on composites formed using a class A SMC matrix formulation, the components of which are set forth in Table 3.

TABLE 3

| COMPONENT | Parts of component per 100 parts of resin |
| --- | --- |
| AROPOL 50405 polyester resin with low profile additive[12] | 100 |
| tertiary butyl perbenzoate | 1 |
| zinc stearate | 3 |
| calcium carbonate | 220 |
| AROPOL 59036 thickener[13] | 10 |

[12]Ashland AROPOL 50405 polyester resin with low profile additive is commercially available from Ashland Chemical.
[13]AROPOL 59036 thickener is commercially available from Ashland Chemical.

TABLE 4

| | Tensile Strength | | Flexural Strength | | Flexural Modulus | | IZOD Impact | |
| --- | --- | --- | --- | --- | --- | --- | --- | --- |
| Sample | (kpsi) | MPa | (kpsi) | MPa | (mpsi) | GPa | (ft lb$_m$) | J/m |
| Control A | 10.7 | 73.8 | 27.1 | 186.9 | 1.72 | 11.9 | 23.3 (11.3% COV) | 1234.0 |
| Test A | 11.9 | 82.1 | 27.0 | 186.2 | 1.64 | 11.3 | 18.5 (18.4% COV) | 980.5 |

Table 5 presents the results of tests conducted on composites formed using the Class A resin system discussed above at 30 weight percent glass content transverse to the knitline. The charge of matrix material was positioned at opposed edges and samples were taken having the knitline (where the charges merge during molding) in the center.

TABLE 5

| | Tensile Strength | | Flexural Strength | | Flexural Modulus | |
| --- | --- | --- | --- | --- | --- | --- |
| SAMPLE | (kpsi) | MPa | (kpsi) | MPa | (mpsi) | GPa |
| Control A | 3.4 | 23.5 | 5.9 | 40.7 | 1.46 | 10.1 |
| Test A | 3.4 | 23.5 | 7.0 | 48.3 | 1.51 | 10.4 |

Table 6 presents the results of tests conducted on composites at 42 weight percent glass content formed using a structural SMC matrix formulation set forth in Table 7 below.

TABLE 6

| | Tensile Strength | | Flexural Strength | | Flexural Modulus | | IZOD Impact | |
| --- | --- | --- | --- | --- | --- | --- | --- | --- |
| Sample | (kpsi) | MPa | (kpsi) | MPa | (mpsi) | GPa | (ft lb$_m$) | J/m |
| Control A | 16.3 | 112.4 | 34.2 | 235.9 | 1.45 | 10.0 | 23.8 | 1261.4 |
| Test A | 17.3 | 119.3 | 33.6 | 231.7 | 1.40 | 9.7 | 20.5 | 1086.5 |

TABLE 7

| COMPONENT | Parts of component per 100 parts of resin |
| --- | --- |
| Reichhold 31-615 polyester resin[14] | 55 |
| NEULON G low profile additive[15] | 35 |
| tertiary butyl perbenzoate | 1 |
| zinc stearate | 3 |
| calcium carbonate | 120 |
| magnesium oxide | 1.8 |
| black pigment | 0.1 |
| styrene | 10 |

[14]Reichhold 21-615 polyester resin is commercially available from Reichhold.
[15]NEULON G low profile additive is commercially available from Union Carbide of Danbury, Connecticut.

Table 8 presents the results of a computerized surface analysis of panels prepared using the Class A automotive resin system discussed above. The tests were conducted using a LORIA® Surface Analyzer, which is commercially available from Ashland Chemical. A 100 square inch scan of the surface of each test panel was evaluated for Ashland Index to determine the waviness of the panel surface, LORIA® DOI to determine the fiber read-through, and unpainted Orange Peel, another evaluation of the waviness of the panel surface. Each result reported in Table 5 is the average of the results of tests conducted upon two test panels of each sample.

TABLE 8

| SAMPLE | Ashland Index | DOI | unpainted orange peel |
| --- | --- | --- | --- |
| Control A | 86 | 96 | 9.5 |
| Test A | 88 | 93 | 9.2 |

As shown in Tables 4–6 and 8, the results of physical property testing of the above samples indicate that composites including the mat of the present invention have similar physical properties but improved handling when compared to the composites produced using roving.

EXAMPLE 2

Two samples of 5509 roving (Controls B and C) sized and having a mean average length as discussed in Example 1 above; eight samples of the mat of the present invention (Samples 1–8 having different variables as discussed in Tables 10 and 11 below) prepared as set forth in Example 1 above; one sample of 5530 roving (Control D) which is commercially available from PPG Industries, Inc. having a sizing composition applied thereto as described in Table 9 below and a mean average length of about 25 millimeters; eight samples of mat (each of Samples 9–16 having different variables as discussed below) the strands of which had applied thereto the sizing composition of Table 9 below; and one sample of mat (Comparative Sample 1) prepared using a primary layer of REEMAY polyester continuous randomly oriented strand mat (which is commercially available from Reemay Inc. Of Old Hickory, Tenn. were used to produce sheet molding compound (SMC) composites with the Class A automotive SMC formulation matrix material set forth in Table 3 above.

Tables 10 and 11 present the results of tests conducted as discussed in Example 1 above on the composites.

TABLE 9

| COMPONENT | Weight of Component per unit of aqueous sizing composition | |
|---|---|---|
| | grams per gallon | grams per liter |
| non-ionic emulsion of a thermosetting epoxy copolymer[16] | 238.6 | 63 |
| n-methylolacrylamide vinyl acetate copolymer emulsion[17] | 413 | 109 |
| vinyl acetate-ethylene copolymer emulsion[18] | 114.8 | 303 |
| gamma-methacryloxypropyltrimethoxysilane[19] | 12.3 | 3.2 |
| gamma-glycidoxypropyltrimethoxysilane[20] | 4.6 | 1.2 |
| partially amidated polyethylene imine[21] | 6.2 | 1.6 |
| acetic acid | 3.1 | 0.8 |
| water | 1600 | 423 |

[16]W60-5520 non-ionic emulsion of a thermosetting epoxy copolymer which is commercially available from Shell Chemical Company of Houston Texas.
[17]RESYN ® 25-2828 n-methylolacrylamide vinyl acetate copolymer emulsion which is commercially available from National Starch of Bridgewater, New Jersey.
[18]AIRFLEX 300 vinyl acetate-ethylene copolymer emulsion which is commercially available from Air Products of Allentown, Pennsylvania.
[19]A-174 gamma-methacryloxypropyltrimethoxysilane which is commercially available from OSi Specialties, Inc. of Danbury, Connecticut.
[20]A-187 gamma-glycidoxypropyltrimethoxysilane which is commerciallly available from OSi Specialties, Inc. of Danbury, Connecticut.
[21]ALUBRASPIN 226 partially amidated polyethylene imine which is available from PPG Industries, Inc.

TABLE 10

| | | Punch Depth | | Punch Density | | mat weight | |
|---|---|---|---|---|---|---|---|
| | Needle | | | (punches per square | (punches per square | | grams per |
| SAMPLE | Gauge | (in) | (mm) | inch) | mm) | oz. per square foot | square meter |
| Control B | — | — | — | — | — | — | — |
| Control C | — | — | — | — | — | — | — |
| Sample 1 | 32/25 | 0.5 | 12.7 | 110 | 17 | 5.1 | 1542 |
| Sample 2 | 32/25 | 0.6 | 15.2 | 110 | 17 | 5 | 1512 |
| Sample 3 | 32/25 | 0.6 | 15.2 | 160 | 25 | 5 | 1512 |
| Sample 4 | 32/25 | 0.5 | 12.7 | 160 | 25 | 5.2 | 1572 |
| Sample 5 | 25 | 0.5 | 12.7 | 160 | 25 | 5.1 | 1542 |
| Sample 6 | 25 | 0.6 | 15.2 | 160 | 25 | 5.7 | 1723 |
| Sample 7 | 25 | 0.6 | 15.2 | 110 | 17 | 5.2 | 1572 |
| Sample 8 | 25 | 0.5 | 12.7 | 110 | 17 | 5.3 | 1603 |
| Control D | — | — | — | — | — | 4.9 | 1482 |
| Sample 9 | 25 | 0.5 | 12.7 | 110 | 17 | 4.8 | 1452 |
| Sample 10 | 25 | 0.6 | 15.2 | 110 | 17 | 5.2 | 1572 |
| Sample 11 | 25 | 0.6 | 15.2 | 160 | 25 | 4.9 | 1482 |
| Sample 12 | 25 | 0.5 | 12.7 | 160 | 25 | 4.9 | 1482 |
| Sample 13 | 32/25 | 0.5 | 12.7 | 160 | 25 | 4.9 | 1482 |
| Sample 14 | 32/25 | 0.6 | 15.2 | 160 | 25 | 5 | 1512 |
| Sample 15 | 32/25 | 0.6 | 15.2 | 110 | 17 | 5.2 | 1572 |
| Sample 16 | 32/25 | 0.5 | 12.7 | 110 | 17 | 4.9 | 1482 |
| Comparative | 32/25 | 0.5 | 12.7 | 110 | 17 | 6 | 1814 |

TABLE 10-continued

| | | Punch Depth | | Punch Density | | mat weight | |
|---|---|---|---|---|---|---|---|
| | Needle | | | (punches per square | (punches per square | | grams per |
| SAMPLE | Gauge | (in) | (mm) | inch) | mm) | oz. per square foot | square meter |
| Example 1 | | | | | | | |

TABLE 11

| SAMPLE | Tensile Strength | | Flexural Strength | | Flexural Modulus | | IZOD Impact | |
|---|---|---|---|---|---|---|---|---|
| | (kpsi) | MPa | (kpsi) | MPa | (mpsi) | GPa | (ft lb$_m$) | J/m |
| Control B | — | — | — | — | — | — | — | — |
| Control C | 10.0 | 69.0 | 28.6 | 197.2 | 1.8 | 12.4 | 17.5 | 927.5 |
| Sample 1 | 11.7 | 80.7 | 23.8 | 164.1 | 1.6 | 11.0 | 14.3 | 757.9 |
| Sample 2 | 11.0 | 75.9 | 25.0 | 172.4 | 1.5 | 10.3 | 15.4 | 816.2 |
| Sample 3 | 12.1 | 83.4 | 28.2 | 194.5 | 1.7 | 11.7 | 13.9 | 736.7 |
| Sample 4 | 11.1 | 76.6 | 30.2 | 208.3 | 1.8 | 12.4 | 13.4 | 710.2 |
| Sample 5 | 11.5 | 79.3 | 27.0 | 186.2 | 1.7 | 11.7 | 13.5 | 715.5 |
| Sample 6 | 12.1 | 83.4 | 28.1 | 193.8 | 1.8 | 12.4 | 16.1 | 853.3 |
| Sample 7 | 11.9 | 82.1 | 29.2 | 201.4 | 2.0 | 13.8 | 17.1 | 906.3 |
| Sample 8 | 11.0 | 75.9 | 30.2 | 208.3 | 2.0 | 13.8 | 14.2 | 752.6 |
| Control D | 9.5 | 65.5 | 23.7 | 163.4 | 1.7 | 11.7 | 15.3 | 810.9 |
| Sample 9 | 10.1 | 69.7 | 25.8 | 177.9 | 1.8 | 12.4 | 14.2 | 752.6 |
| Sample 10 | 11.4 | 78.6 | 29.1 | 200.7 | 2.0 | 13.8 | 16.1 | 853.3 |
| Sample 11 | 11.1 | 76.6 | 28.8 | 198.6 | 1.9 | 13.1 | 12.9 | 683.7 |
| Sample 12 | 10.7 | 73.8 | 24.8 | 171.0 | 1.8 | 12.4 | 12.9 | 683.7 |
| Sample 13 | 11.3 | 77.9 | 24.1 | 166.2 | 1.7 | 11.7 | 11.7 | 620.1 |
| Sample 14 | 11.1 | 76.6 | 28.6 | 197.2 | 1.8 | 12.4 | 14.2 | 752.6 |
| Sample 15 | 11.3 | 77.9 | 26.9 | 185.5 | 1.8 | 12.4 | 13.0 | 689.0 |
| Sample 16 | 11.8 | 81.4 | 26.9 | 185.5 | 1.8 | 12.4 | 14.9 | 789.7 |
| Comp. Ex. 1 | 12.6 | 86.9 | 29.7 | 204.8 | 2.0 | 13.8 | 16.5 | 874.5 |

The controls and samples were also evaluated for flow of the matrix material through the composite during molding. Ten panels for each Sample and Control were prepared for testing. The controls and samples of the composites were molded at 149° C. (300° F.) for 90 seconds at about 120 psi to produce plaques. Four plys of mat were used to prepare the samples. The charge was positioned at the same side of each sample over an area of about 89×381 millimeters (3.5×15 inches). The weight of each panel and average flow length within each panel were measured. The test results reported in Table 13 represent the mean average flow length in millimeters and inches, the values being adjusted to a common basis of a 750 gram charge.

The results of testing for wet-out (permeability) are also set forth in Table 13. The matrix formulation is set forth in Table 12. Each Sample was run in side by side evaluation with the appropriate Control having the same sizing composition applied thereto. The matrix material was dispersed onto a polyethylene film carrier at a loading of about 10 ounces per square foot. On one side of the carrier, the Control material was deposited upon the matrix material. On the other side of the carrier, the Sample mats prepared according to the present invention were deposited upon the matrix material and the test samples were compacted using a conventional roller. The results of visual determinations as to the proportion of dark, resinous area (which indicates that the matrix material wet-out the test samples) to white, dry areas (indicating insufficient wet-out) are reported below in Table 13.

TABLE 12

| COMPONENT | Parts of component per 100 parts of resin |
|---|---|
| Reichhold 31-615 polyester resin[22] | 56 |
| NEULON G low profile additive[23] | 36 |
| tertiary butyl perbenzoate | 1 |
| calcium carbonate | 170 |
| black pigment | 1 |
| styrene | 8 |

[22]Reichhold 31-615 polyester resin is commercially available from Reichhold.
[23]NEULON G low profile additive is commercially available from Union Carbide of Danbury, Connecticut.

TABLE 13

| SAMPLE | Adjusted Flow Length (inches) | Adjusted Flow Length (mm) | Wet-Out (Permeability) percent |
|---|---|---|---|
| Control B | — | — | 85 |
| Control C | 14.48 | 368 | 90 |
| Sample 1 | 10.78 | 274 | 80 |
| Sample 2 | 10.55 | 268 | 85 |
| Sample 3 | 9.56 | 243 | 80 |
| Sample 4 | 9.80 | 249 | 75 |
| Sample 5 | 9.96 | 253 | 80 |
| Sample 6 | 8.98 | 228 | 75 |
| Sample 7 | 9.78 | 248 | 80 |
| Sample 8 | 10.47 | 266 | 90 |
| Control D | 14.70 | 373 | 95 |
| Sample 9 | 11.93 | 303 | 95 |
| Sample 10 | 11.05 | 281 | 90 |
| Sample 11 | 10.81 | 275 | 85 |
| Sample 12 | 11.31 | 287 | 92 |
| Sample 13 | 11.45 | 291 | 90 |
| Sample 14 | 10.67 | 271 | 88 |
| Sample 15 | 11.47 | 291 | 92 |
| Sample 16 | 11.96 | 304 | 88 |
| Comp. Ex. 1 | 9.16 | 233 | 65 |

As shown in Table 13, the composites including mats formed in accordance with the present invention had comparable adjusted flow lengths to the Control samples, which indicates that the matrix materials were able to successfully penetrate and impregnate the composites including such mats formed in accordance with the present invention than conventional composites. The sample of Comparative Example 1 exhibited poor wet-out in comparison to the composites including mats formed in accordance with the present invention.

The mats of the present invention have sufficient structural integrity to resist damage during transportation and handling and are useful in a wide variety of molding processes. The mats of the present invention are particularly advantageous for replacing the roving supply system typically used to form mat at a sheet molding compounder's facility while maintaining comparable wet-out and other physical properties to such roving mat. The mats of the present invention also provide good z-direction reinforcement due to the needling and the capability of using multiple sheets of reinforcement mat, which unneedled mats typically formed from roving at a molder's facility lack.

Other advantages of the mats of the present invention include good cross directional uniformity, low washing or squeeze out during mat compaction during molding, low delamination and springback of the mat during composite formation, good flexibility, processing and sheet loft performance, high reinforcement weight capability, good flow and knitline properties, good surface and blister characteristics.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A mat adapted to reinforce a thermosetting matrix material to form a reinforced composite, the mat comprising:

(a) a primary, supporting layer comprising a plurality of randomly oriented essentially continuous glass fiber strands coated with a sizing composition on at least a portion of surfaces thereof, the sizing composition comprising a thermosetting film-forming material which is compatible with the thermosetting matrix material, the primary layer comprising about 1 to about 20 weight percent of the mat on a total solids basis; and (b) a secondary layer positioned upon and supported by a surface of the primary layer, the secondary layer comprising a plurality of glass fiber strands coated with a second sizing composition on at least a portion of surfaces thereof, the second sizing composition comprising a thermosetting film-forming material which is compatible with the thermosetting matrix material, the mean average length of the glass fiber strands of the secondary layer ranging from about 20 to about 125 millimeters, wherein the strands of the primary layer are entangled with the strands of the secondary layer by needling the primary layer and the secondary layer together and the mat has a surface weight ranging from about 300 to about 3060 grams per square meter.

2. The mat according to claim 1, wherein the glass fiber strands of the primary layer have on at least a portion of the surfaces thereof the essentially dried residue of the sizing composition.

3. The mat according to claim 2, wherein the sizing composition further comprises a glass fiber lubricant and a coupling agent.

4. The mat according to claim 2, wherein the glass fiber strands of the secondary layer have on at least a portion of the surfaces thereof the essentially dried residue of the second sizing composition.

5. The mat according to claim 4, wherein the second sizing composition is different from the first sizing composition.

6. The mat according to claim 1, wherein the primary layer comprises about 1 to about 5 weight percent of the mat on a total solids basis.

7. The mat according to claim 1, wherein the glass fiber strands of the secondary layer are chopped.

8. The mat according to claim 1, wherein the glass fiber strands of the secondary layer have a mean average length ranging from about 25 to about 100 millimeters.

9. The mat according to claim 1, wherein the second sizing composition further comprises a glass fiber lubricant and a coupling agent.

10. The mat according to claim 1, wherein the primary layer and secondary layer are needled together at a punch density ranging from about 12 to about 31 punches per square centimeter.

11. The mat according to claim 1, wherein the primary layer further comprises a plurality of randomly oriented essentially continuous polymeric fibers.

12. The mat according to claim 11, wherein the essentially continuous polymeric fibers of the primary layer comprise about 1 to about 50 weight percent of the primary layer on a total solids basis.

13. The mat according to claim 1, wherein the secondary layer further comprises a plurality of polymeric fibers, the polymeric fibers having a mean average length ranging from about 20 to about 125 millimeters.

14. The mat according to claim 13, wherein the polymeric fibers of the secondary layer comprise about 1 to about 10 weight percent of the secondary layer on a total solids basis.

15. A reinforced polymeric composite comprising:
   (a) a thermosetting matrix material; and
   (b) a reinforcing mat comprising:
      (1) a primary, supporting layer comprising a plurality of randomly oriented essentially continuous glass fiber strands coated with a sizing composition on at least a portion of surfaces thereof, the sizing composition comprising a thermosetting film-forming material which is compatible with the thermosetting matrix material, the primary layer comprising about 1 to about 20 weight percent of the mat on a total solids basis; and
      (2) a secondary layer positioned upon and supported by a surface of the primary layer, the secondary layer comprising a plurality of glass fiber strands coated with a second sizing composition on at least a portion of surfaces thereof, the second sizing composition comprising a thermosetting film-forming material which is compatible with the thermosetting matrix material, the mean average length of the glass fiber strands of the secondary layer ranging from about 20 to about 125 millimeters, wherein the strands of the primary layer are entangled with the strands of the secondary layer by needling the primary layer and the secondary layer together and the mat has a surface weight ranging from about 300 to about 3060 grams per square meter.

16. A method for making a mat adapted to reinforce a thermosetting matrix material to form a reinforced composite, the method comprising the steps of:
   (a) dispersing a plurality of essentially continuous glass fiber strands to form a primary, support layer, the glass fiber strands being coated with a sizing composition on at least a portion of surfaces thereof, the sizing composition comprising a thermosetting film-forming material which is compatible with the thermosetting matrix material, the primary layer comprising about 1 to about 20 weight percent of the mat on a total solids basis, such that the glass fiber strands of the primary layer are randomly oriented; and
   (b) dispersing a plurality of chopped glass fiber strands upon a surface of the primary layer, the mean average length of the chopped glass fiber strands ranging from about 20 to about 125 millimeters, the chopped glass fiber strands being coated with a second sizing composition on at least a portion of surfaces thereof, the second sizing composition comprising a thermosetting film-forming material which is compatible with the thermosetting matrix material; and
   (c) entangling the essentially continuous glass fiber strands of the primary layer with the chopped glass fiber strands of the secondary layer by needling the layers together to form a mat, the mat having a surface weight ranging from about 300 to about 3060 grams per square meter.

17. A method for reinforcing a thermosetting matrix material to form a reinforced composite, the method comprising the steps of:
   (a) dispersing a plurality of essentially continuous glass fiber strands to form a primary, support layer, such that the glass fiber strands of the primary layer are randomly oriented the glass fiber strands being coated with a sizing composition on at least a portion of surfaces thereof, the sizing composition comprising a thermosetting film-forming material which is compatible with the thermosetting matrix material, the primary layer comprising about 1 to about 20 weight percent of the mat on a total solids basis; and
   (b) dispersing a plurality of chopped glass fiber strands upon a surface of the primary layer, the mean average length of the chopped glass fiber strands ranging from about 20 to about 125 millimeters, the chopped glass fiber strands being coated with a second sizing composition on at least a portion of surfaces thereof, the second sizing composition comprising a thermosetting film-forming material which is compatible with the thermosetting matrix material;
   (c) entangling the essentially continuous glass fiber strands of the primary layer with the chopped glass fiber strands of the secondary layer by needling the layers together to form a mat, the mat having a surface weight ranging from about 300 to about 3060 grams per square meter;
   (d) coating and impregnating at least a portion of the mat with a thermosetting matrix material; and
   (e) at least partially curing the thermosetting matrix material to form a reinforced composite.

* * * * *